Aug. 23, 1938.　　　F. POSTMA　　　2,127,528
ABRADING DEVICE
Filed Nov. 5, 1937　　　2 Sheets-Sheet 1

Inventor
Frank Postma,
By J. Stanley Burch
Attorney

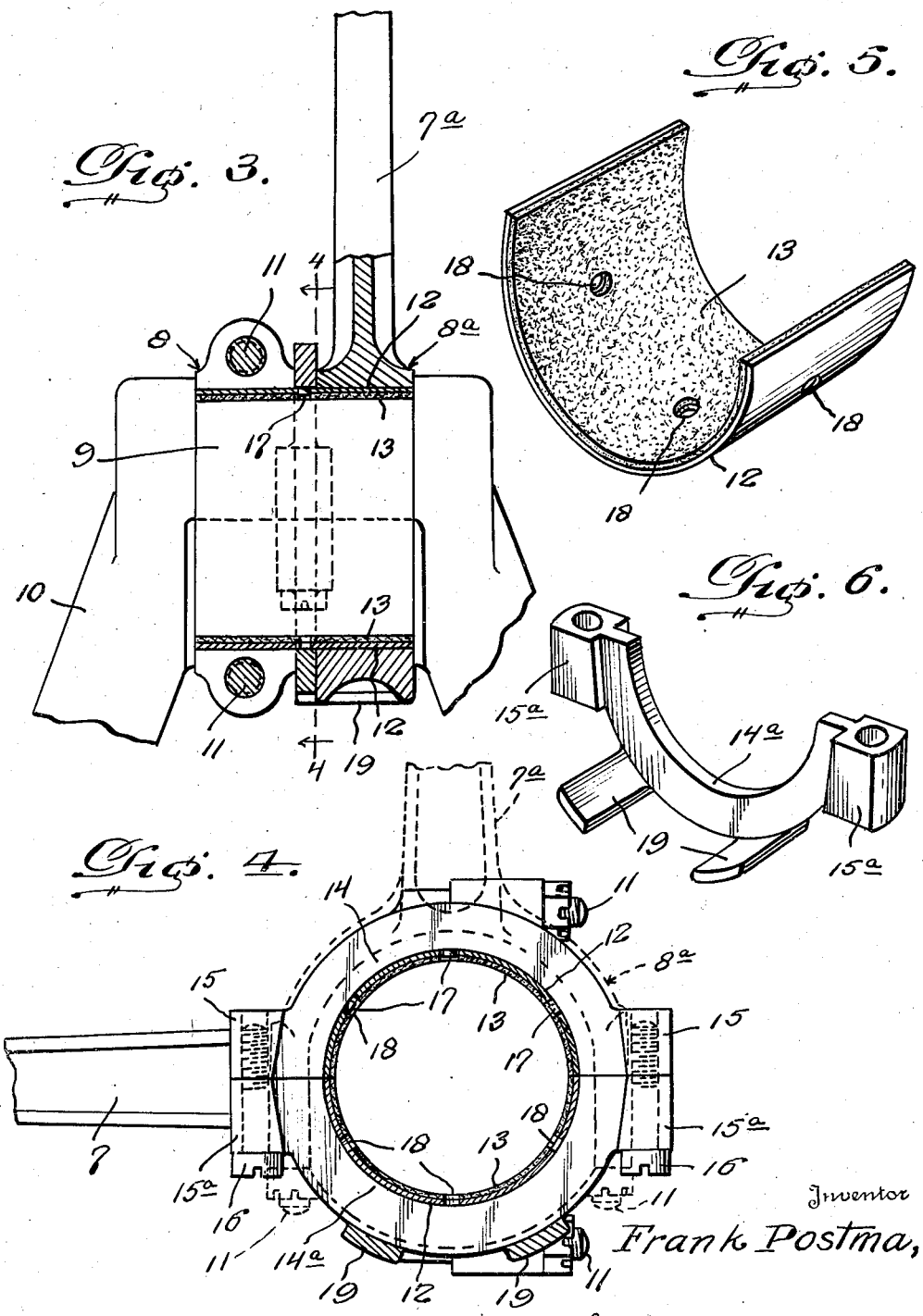

Patented Aug. 23, 1938

2,127,528

UNITED STATES PATENT OFFICE 2,127,528

ABRADING DEVICE

Frank Postma, Ridgewood, N. J.

Application November 5, 1937, Serial No. 173,014

5 Claims. (Cl. 51—204)

This invention relates to abrading devices, and has more particular reference to novel and efficient means for carrying out the abrading method generally disclosed in my co-pending application Ser. No. 164,390, filed September 17, 1937, in connection with the crank journals of the crankshaft of an engine of the V-type wherein the bearings of two connecting rods are engaged with each crank journal of the engine crankshaft.

The primary object of the present invention is to provide an abrading device of the above kind including an abrading liner of the type disclosed in my co-pending application Ser. No. 164,389, filed September 17, 1937, arranged to engage in the bores of the bearings of both connecting rods engaged with a crank journal of the crankshaft of an engine of the V-type for abrading said journal throughout the length thereof in one and the same abrading operation, means being provided to effectively support and clamp the abrading liner sections together between the bearings of the connecting rods and to space the connecting rod bearings so that they will properly surround and back the abrading liner sections at the ends of the latter.

A further object of the present invention is to provide means for keying the abrading liner to the clamp which clamps the abrading liner sections intermediate their ends and spaces the bearings of the connecting rods, and means to restrain said clamp against undue turning relative to one of the connecting rod bearings so as to thereby prevent complete turning of the abrading liner relative to the crankshaft journal.

With the above general objects in view, the present invention consists in the novel form, combination and arrangement of parts hereinafter more fully described, shown in the accompanying drawings and claimed.

In the drawings:

Figure 4 is a section on line 4—4 of Figure 3.

Figure 5 is an enlarged perspective view of one of the sections of the abrading liner shown in Figures 1 to 4 inclusive.

Figure 6 is a perspective view of one section of the abrading liner clamp and connecting rod bearing spacing means; and Figure 7 is a perspective view of the other section of said abrading liner clamp and bearing spacing means.

Figure 1:
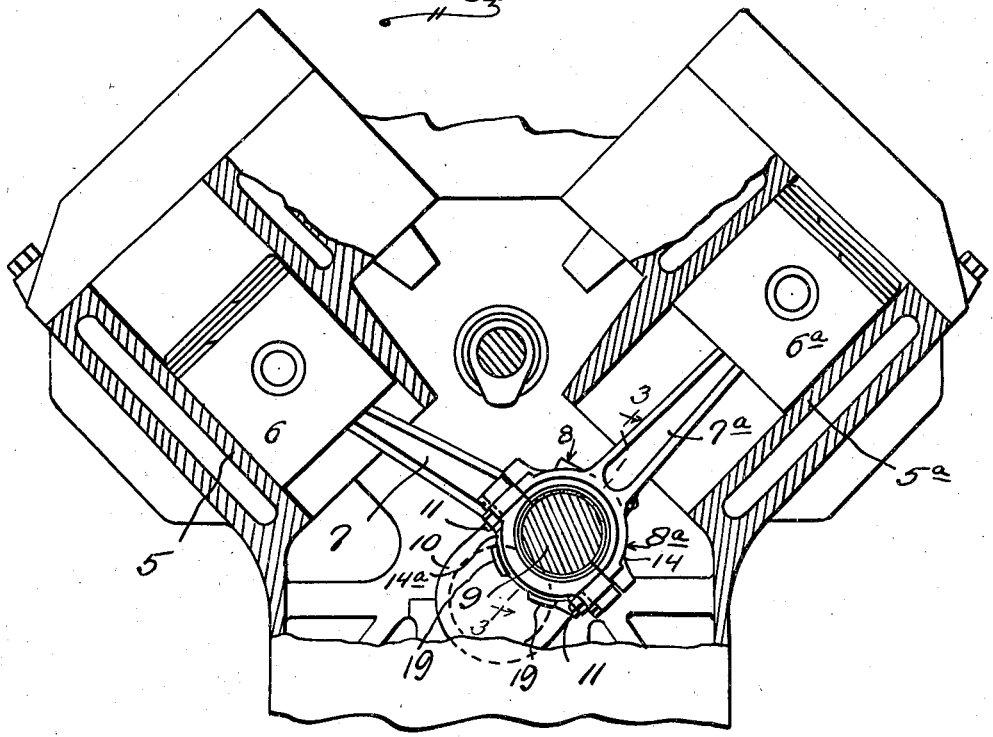
Figure 1 is a fragmentary view, partly in transverse vertical section, of an engine of the V-type having an abrading device operatively associated with a crankshaft journal and associated connecting rod bearings thereof, said abrading device embodying the present invention.

Referring in detail to the drawings, 5 and 5a indicate upwardly diverging transversely alined cylinders of an engine of the V-type in which are reciprocable the pistons 6 and 6a having connecting rods 7 and 7a provided at their lower ends with crankshaft bearings 8 and 8a. In this type of engine, the connecting rod bearings 8 and 8a are both engaged with the same crank journal 9 of the engine crankshaft 10, each bearing consisting of a bearing block integral with the connecting rod and having a bearing cap bolted thereto as at 11. The crank journal 9 is of a length slightly greater than the combined widths of both of the bearings 8 and 8a, and said bearings 8 and 8a are normally provided with bearing liners which are clamped in place by the bolts at 11 and which project at both sides of the respective bearings to space the latter from each other and the shoulders at the ends of the journal 9 in the normal operation of the engine. It will therefore be apparent that a definite clearance will be had between the bearings 8 and 8a when their bearing liners are removed and said bearings are spread apart to engage at their outer sides with the shoulders at the ends of the crank journal 9. I utilize this clearance as will presently be made apparent.

Figure 2:
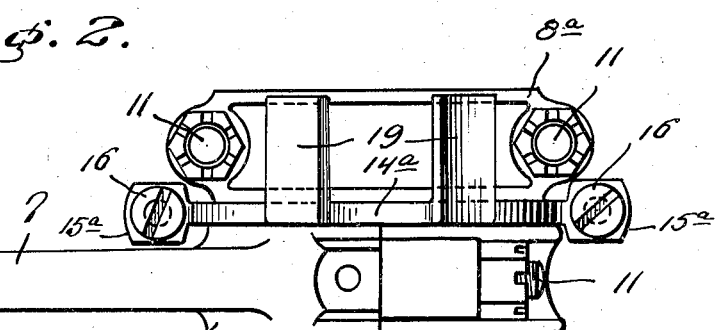
Figure 2 is an enlarged view looking upwardly at the connecting rod bearings and abrading device when operatively associated as in Figure 1.
Figure 3:
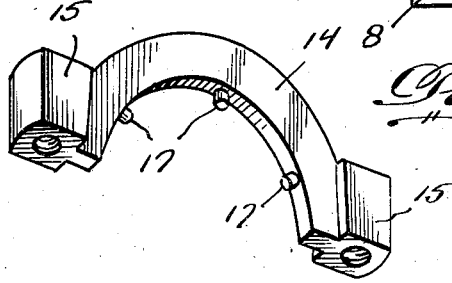
Figure 3 is a fragmentary vertical section taken on the plane of line 3—3 of Figure 1, and drawn on an enlarged scale, parts being omitted.

In accordance with the present invention, an abrading liner is provided for being fitted in the bearings 8 and 8a of both connecting rods 7 and 7a upon removal of the bearing liners therefrom, such abrading liner consisting of a pair of semi-cylindrical members, each composed of a thin outer shell 12 adapted to seat against the bores of the bearings 8 and 8a and having secured or bonded to its inner surface granular abrading material 13 which bears upon the crankshaft journal 9. This abrading liner is of the same width or length as the journal 9 and slightly wider or longer than the combined width of the bearings 8 and 8a with their bearing liners removed. Thus, when the bearings 8 and 8a are spread apart to abut the shoulders at the ends of the journal bearing, a clearance or space is left between the bearings 8 and 8a as shown clearly in Figures 2 and 3. By separating the bearings 8 and 8a in this way, the abrading liner is securely backed and clamped throughout the ends thereof by the bearings 8 and 8a, but it is necessary to clamp and support the intermediate portion of the abrading liner between the bearings 8 and 8a in order to insure against destruction of the abrading liner due to the rotation of the crank journal 9 in the abrading liner and the rocking movements of bearings 8 and 8a in different directions when the crankshaft is rotated during the abrading operation. For clamping and supporting the intermediate portion of the abrading liner, I provide a narrow clamping ring capable of snugly fitting between the bearings 8 and 8a and about the abrading liner, said clamp being preferably composed of a pair of semi-circular members 14 and 14a having cooperating apertured lugs 15 and 15a at their ends for reception of clamping bolts 16 by which the sections 14 and 14a are securely fastened in place and together. The bolts 16 may pass freely through the apertured lugs 15a of section 14a and be threaded into the lugs 15 of section 14, as shown. It is also necessary to limit turning of the abrading liner with the journal 9, and for this purpose I provide at least one of the clamp sections with inwardly projecting pins 17 arranged to engage in apertures 18 provided in the associated abrading liner section, one of the clamp sections being provided with laterally projecting lugs 19 arranged to cooperate with one of the connecting rods to limit turning of the clamp and abrading liner relative to said connecting rod. As shown, the pins 17 may be provided on clamp section 14 and the lugs 19 provided on the clamp section 14a, said lugs 19 being disposed to engage one of the bearings 8 or 8a between the ears and clamping bolts 11 of that bearing. Thus, as soon as the crank shaft is rotated, one of the lugs 19 will engage the ear and clamping bolt 11 of the bearing 8a when the clamp is disposed as shown in the drawings, thereby preventing further turning of the abrading liner relative to said bearing and with the crankshaft journal 9. However, the lugs 19 are spaced a lesser distance apart than the bolts 11 at opposite sides of said bearing 8a so that the abrading liner and clamp may be shifted out of the way for permitting ready access to and removal of the bolts 11 of bearing 8a when the abrading operation is completed, to permit removal of the abrading liner and clamp when the cap members of the bearings 8 and 8a are detached. It will of course be understood that pins 17 need only project into the backing 12 and not into the abrading material 13 for contact with the journal 9. While the pins 17 are efficient for their intended purpose, it is readily possible to provide any other suitable means for keying the clamp to the abrading liner, as well as providing other suitable means than the lugs 19 for limiting or restraining the abrading liner against complete rotation with the crankshaft journal 9. These are very simple and efficient means for these purposes, and are at present preferred.

In using the present abrading device, the general abrading method is used as described in my co-pending application Ser. No. 164,390, filed September 17, 1937. In other words, with the parts assembled as shown in Figures 1 to 4 inclusive, the crankshaft is rotated by suitable means so as to subject the journal 9 throughout its length to the abrading action of the abrading liner. More than one step may be involved in the abrading operation, a coarse-abrasive liner being initially used for truing the journal 9, and a finer abrading liner being subsequently used to smooth or polish the journal.

From the foregoing description, it is believed that the construction and manner of use as well as the advantages of the present invention will be readily understood and appreciated by those skilled in the art.

What I claim as new is:

1. An abrading device for an engine crankshaft journal which accommodates the bearings of two connecting rods and which allows clearance between said bearings when the bearing liners of the latter are removed, comprising an abrading liner adapted to seat against the bores of both bearings and to bear upon the crankshaft journal throughout the length of the latter, and means for clamping and supporting said abrading liner between said bearings.

2. An abrading device for an engine crankshaft journal which accommodates the bearings of two connecting rods and which allows clearance between said bearings when the bearing liners of the latter are removed, comprising an abrading liner composed of a pair of semi-cylindrical members adapted to seat against the bores of both bearings and to bear upon the crankshaft journal throughout the length of the latter, and means for clamping and supporting said abrading liner between said bearings, said clamping and supporting means comprising coacting semi-circular clamp members detachably bolted together.

3. An abrading device for an engine crankshaft journal which accommodates the bearings of two connecting rods and which allows clearance between said bearings when the bearing liners of the latter are removed, comprising an abrading liner composed of a pair of semi-cylindrical members adapted to seat against the bores of both bearings and to bear upon the crankshaft journal throughout the length of the latter, means for clamping and supporting said abrading liner between said bearings, said clamping and supporting means comprising coacting semi-circular clamp members detachably bolted together, means to key said clamping and supporting means to the bearing liner against relative rotation, and means engageable with one of the connecting rods for limiting rotation of the abrading liner relative to the bearing of said one connecting rod.

4. An abrading device for an engine crankshaft journal which accommodates the bearings of two connecting rods and which allows clearance between said bearings when the bearing liners of the latter are removed, comprising an abrading liner composed of a pair of semi-cylindrical members adapted to seat against the bore of both bearings and to bear upon the crankshaft journal throughout the length of the latter, means for clamping and supporting said abrading liner between said bearings, said clamping and supporting means comprising coacting semi-circular clamp members detachably bolted together, means to key said clamping and supporting means to the bearing liner against relative rotation, and means engageable with one of the connecting rods for limiting rotation of the abrading liner relative to the bearing of said one connecting rod, said abrading liner having apertures, and said keying means comprising inwardly projecting pins engaging in said apertures and carried by one of the clamping members.

5. An abrading device for an engine crankshaft journal which accommodates the bearings of two connecting rods and which allows clearance between said bearings when the bearing liners of the latter are removed, comprising an abrading liner composed of a pair of semi-cylindrical members adapted to seat against the bores of both bearings and to bear upon the crankshaft journal throughout the length of the latter, means for clamping and supporting said abrading liner between said bearings, said clamping and supporting means comprising coacting semi-circular clamp members detachably bolted together, means to key said clamping and supporting means to the bearing liner against relative rotation, and means engageable with one of the connecting rods for limiting rotation of the abrading liner relative to the bearing of said one connecting rod, the means for limiting turning of the abrading liner and clamping means relative to the bearing of said one connecting rod comprising laterally projecting lugs on one of the clamping members engageable with said connecting rod.

FRANK POSTMA.